M. D. PRICE.
WHEEL.
APPLICATION FILED JAN. 19, 1912.
1,078,461. Patented Nov. 11, 1913.
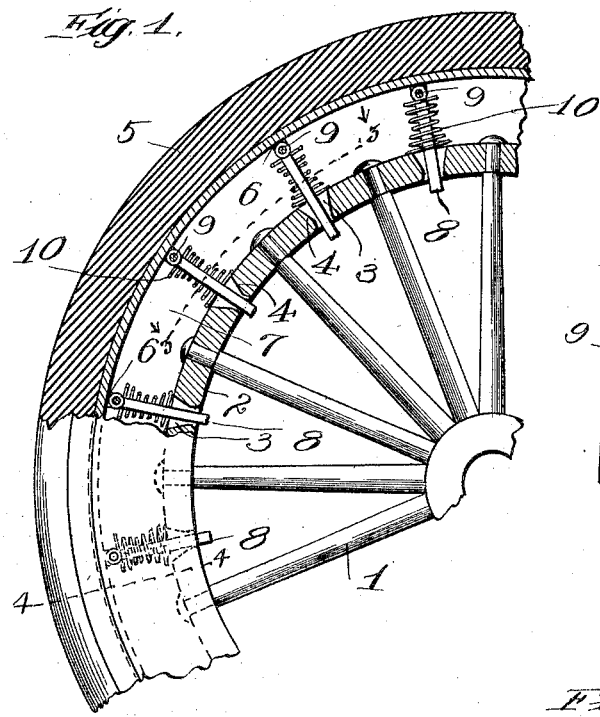
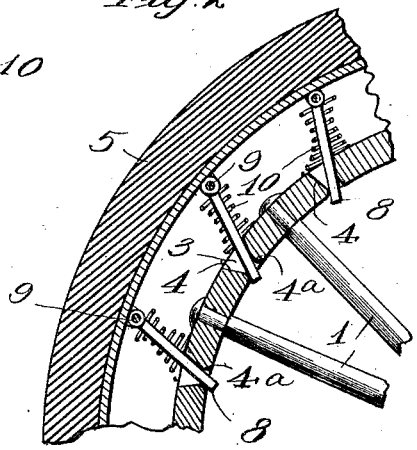
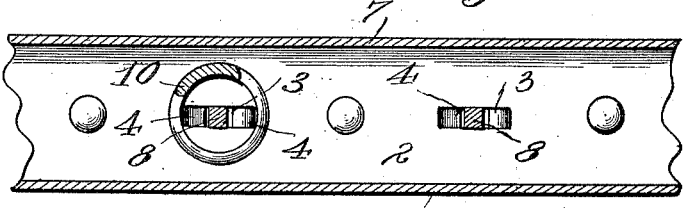
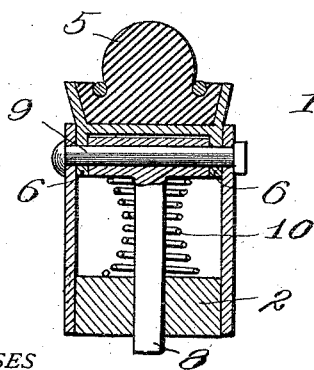
WITNESSES
INVENTOR
Mitchell D. Price,
By Knight Bros
Attorney

UNITED STATES PATENT OFFICE.

MITCHELL D. PRICE, OF MIAMI, FLORIDA.

WHEEL.

1,078,461. Specification of Letters Patent. Patented Nov. 11, 1913.

Application filed January 19, 1912. Serial No. 672,262.

*To all whom it may concern:*

Be it known that I, MITCHELL D. PRICE, a citizen of the United States, residing in the city of Miami, county of Dade, and State of Florida, have invented certain new and useful Improvements in Wheels, of which the following is a specification.

The object of my invention is to provide a spring wheel especially adapted for use on automobiles, but capable of general application.

A further object of my invention is to provide a spring wheel of simple, effective and durable construction; and with these and minor objects in view, my invention consists of the parts and combination of parts as will be hereinafter more fully set forth.

In the drawing—Figure 1 is a detail elevation of a wheel embodying my invention, parts being in section; Fig. 2 is a similar view with the parts in abnormal position; Fig. 3 is a sectional view on the line 3—3, Fig. 1; Fig. 4 is a detail sectional view on the line 4—4, Fig. 1; and Fig. 5 is a side elevation of one of the stub shafts.

The inner wheel is provided with the spokes 1 of any suitable construction, and a metallic rim 2, which rim will be referred to in the specification and claim as the inner rim. This inner rim is provided with bearing openings 3 in its periphery, spaced an equal distance between each pair of spokes. These openings are elongated as shown in Fig. 3, with the side walls parallel, while the front and rear walls are flared toward the top and bottom of the openings as indicated by the reference numerals 4 and 4ª. The outer rim or tread may be of any suitable material, but I prefer to use metal. This outer rim may be flat or of any preferred shape, but I prefer to have it concaved and secure thereto a solid rubber tie 5.

6 are a series of perforated ears or lugs extending inwardly at intervals from the outer rim, to which are bolted or otherwise suitably secured flanges 7, which flanges extend to or beyond the inner rim so as to inclose the space between the outer and inner rims, as clearly shown in the drawing.

8 is a T-shaped stub rod pivotally mounted on a bolt 9, which bolt passes through the flanges 7 and ears 6, thus serving the dual function as a shaft or bearing for the stub rod 8 and a binding medium for the flanges 7, as clearly shown in Fig. 4. The free end of the stub shaft 8 projects through the bearing opening 3 in the inner rim and is adapted to reciprocate in said opening, as will be hereinafter pointed out. The free end of the stub shaft may be of any desired cross section, but in all cases it must fit snugly between the side walls of the bearing opening 3 in the inner rim to prevent relative sidewise movement between the inner rim and the outer rim and sustain side thrusts.

10 is a coil spring which tapers from each end toward the middle, in order that the spring may be more or less centered by the stub shaft 8. One end of the coil spring is seated against the inner rim, while the other end is seated on the T-head of the stub rod, as clearly shown in Fig. 4.

In use, the coil springs 10 absorb all shocks incident to travel of the wheel over a road, and when the springs are compressed by a shock due to an irregularity or obstruction in the road, the stub shafts 8 slide through the bearing openings 3 in the inner rim. Under abnormal friction between the road bed and the tread of the wheel, the tread is more or less retarded, while the inner rim is being propelled by the engine. Under these conditions, the stub rod 8 slides along the side walls of the bearing opening 3 until it comes into engagement with the front or rear wall 4 of the bearing opening (dependent upon the direction of travel), thus providing means for a relative circumferential movement between the two rims, the parallel side walls of the bearing opening 3 holding the two rims against relative sidewise motion. Under these conditions, the stub rods swing on their pivot bearing or journal 9 with their free ends rocking on the point of juncture between the oppositely flared walls 4 and 4ª, as shown in Fig. 2, thus there is no binding between the front and rear walls of the bearing opening 3 and the free end of the stub rod 8.

The side flanges 7 are preferably made of metal and as above described, are secured to the outer rim by means of the bolts 9 and extend from the outer rim to the inside of the inner rim, working smoothly against the edges of the inner rim so as to reduce friction between the two elements to a minimum. These flanges completely inclose the space between the inner and outer rims and prevent mud, etc., from entering the space between the two rims. Of course, it is not necessary to the successful operation of my invention that these flanges be used, but I prefer their embodiment in the wheel, as it gives the wheel a more conventional appearance.

I claim:—

In a wheel, the combination with an inner rim having openings therethrough with parallel side walls and front and rear walls diverging toward the top and bottom of the openings, said openings constituting bearings of uniform width axially of the wheel, and in the plane thereof increasing in width toward each end from the center thereof, thereby permitting backward and forward and reciprocal movements only, of a stub rod, of an outer rim, lugs extending inwardly from said outer rim, detachable flanges extending from the outer rim to the inner rim and overlapping the inner rim, a T-shaped stub rod between said lugs of the outer rim, a bolt passing through said side flanges, said stub rod and said lugs and constituting a common connecting member, and a coil spring secured around said stub rod with one end seated on the inner rim and the other end seated on the T-head of the stub rod; the free end of said stub rod projecting through and adapted to reciprocate and rock in the bearings in the inner rim.

The foregoing specification signed at Miami, Florida, this 12th day of July, 1911.

MITCHELL D. PRICE.

In presence of two witnesses:
S. R. RAILEY,
B. P. CROWELL.

Copies of this patent may be obtained for five cents each, by addressing the "Commissioner of Patents, Washington, D. C."